United States Patent [19]

Minagawa et al.

[11] 4,201,747
[45] May 6, 1980

[54] METHOD OF SEPARATING YTTRIUM IONS

[75] Inventors: Yukinori Minagawa, Ebina; Tsugio Kaneko, Tokyo; Kunihiko Yamaguchi, Yokohama, all of Japan

[73] Assignee: Mitsubishi Chemical Industries Ltd., Tokyo, Japan

[21] Appl. No.: 949,010

[22] Filed: Oct. 6, 1978

[30] Foreign Application Priority Data

Oct. 11, 1977 [JP] Japan .................. 52-121740
Apr. 19, 1978 [JP] Japan .................. 53-46094

[51] Int. Cl.² ............................. C01F 17/00
[52] U.S. Cl. ................. 423/21.5; 423/DIG. 14; 75/101 BE
[58] Field of Search ............ 423/21, 658.5, DIG. 14, 423/DIG. 19, 21.5; 75/101 BE

[56] References Cited

U.S. PATENT DOCUMENTS

| | | | |
|---|---|---|---|
| 3,575,687 | 4/1971 | Drobnick et al. | 423/DIG. 19 |
| 3,578,391 | 5/1971 | Chiola et al. | 423/DIG. 19 |
| 3,598,520 | 8/1971 | Chiola et al. | 423/DIG. 19 |
| 3,615,173 | 10/1971 | Wignet et al. | 423/DIG. 19 |
| 4,104,358 | 8/1978 | Minagawa et al. | 423/658.5 |

FOREIGN PATENT DOCUMENTS 46-6706  2/1971  Japan .................. 423/DIG. 19

OTHER PUBLICATIONS

Hardes et al., "J. of Inorganic & Nuclear Chem.," vol. 11, 1959, pp. 197–209.

Primary Examiner—Herbert T. Carter
Attorney, Agent, or Firm—Oblon, Fisher, Spivak, McClelland & Maier

[57] ABSTRACT

Yttrium ions are selectively separated by extracting the yttrium ions by contacting an aqueous solution containing hydroxyethyl ethylenediaminetriacetic acid, yttrium ions and lanthanide ions with an extracting solvent containing tributyl phosphate and an acid phosphoric ester having the formula

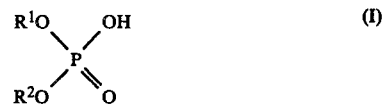

wherein $R^1$ represents hydrogen atom or an alkyl group having the formula

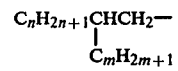

wherein n is an integer of 6 to 15 and m is n−1 or n−2; and $R^2$ represents an alkyl group having the formula

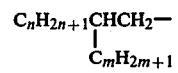

wherein n is an integer of 6 to 15 and m is n−1 or n−2.

5 Claims, No Drawings

METHOD OF SEPARATING YTTRIUM IONS

BACKGROUND OF THE INVENTION

The present invention relates to a selective extraction of yttrium ions.

A demand of yttrium compounds has been great as industrial sources especially those of an electronics field such as a red fluorescent material for a color TV and a raw material for an optical lens.

Heretofore, an ion exchange method has been employed as a method of separating yttrium ions from an aqueous solution of rare earth components including a yttrium ions. In this method, an aqueous solution of the rare earth compounds in a quite low concentration has been treated whereby the concentration of a purified aqueous solution of the yttrium ions has been two low, and a large apparatus has been required for concentrating it and moreover, the productivity has been low since the flow rate of an eluent passing through an ion exchange resin column is remarkably slow.

A method of separating yttrium ions by a solvent extraction has been proposed as a method of improved said disadvantages of the ion exchange method, for example, a method of separating yttrium ions from heavy rare earth ions by extracting it with an extracting solvent of quaternary ammonium salt in the presence of a thiocyanide ions (Japanese Examined Patent Publication No. 4328/1970 and No. 103815/1974) or a method of selectively extracting yttrium ions from an aqueous solution of rare earth nitrates including yttrium nitrate with a mixed solvent of a cation exchange liquid and an anion exchange liquid (U.S. Pat. No. 3,575,687) However, in the former method, there are disadvantages that thiocyanide ions are easily decomposed to cause various troubles in a control of an operation and light rare earth ions should be separated by the other method.

In the latter method, there are disadvantages that a separation factor of yttrium ions from the other rare earth ions is small (2 to 3) and extractions in several tens stages are required to obtain an yttrium ions in high purity.

SUMMARY OF THE INVENTION

It is an object of the present invention to overcome the disadvantages of the conventional solvent extracting method and to provide an improved solvent extracting method.

The foregoing and other objects of the present invention have been attained by providing a method of separating yttrium ions from the other rare earth ions in high efficiency by adding a complexing agent of hydroxyethylethylenediaminetriacetic acid (hereinafter referred to as HEDTA) and using a mixed solvent of tributyl phosphate and an acid phosphoric ester having the formula

wherein $R^1$ and $R^2$ respectively represent hydrogen atom or an alkyl group having the formula

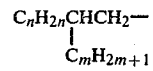

wherein n is an integer of 6 to 15 and m is $n-1$ or $n-2$ and both of $R^1$ and $R^2$ are not hydrogen atoms.

DETAILED DESCRIPTION OF THE INVENTION

The method of the present invention is applied for separating yttrium ions from rare earth ions containing the yttrium ions and lanthanide ions (lanthanides means elements of atomic No. 57 to 71).

The rare earth compounds are produced as natural sources of monaxite and xenotime. Xenotime is mainly used as a raw material for producing an yttrium component.

In the method of the present invention, when such ore or solid rare earth compounds such as mixed rare earth oxides are used as a raw material, the raw material is dissolved in an aqueous solution of an acid such as nitric acid and hydrochloric acid and HEDTA is added to adjust the concentration of the components and pH and the mixture is used as an extraction feed.

A concentration of the rare earth ions including yttrium ions and lanthanide ions in the extraction feed is usually adjusted in a range of 0.005 to 2 g atom/liter preferably 0.05 to 0.5 g. atom/liter. The lanthanide ions can be one or more kinds of them. On the other hand, an amount of HEDTA incorporated in the extraction feed depends upon a ratio of the yttrium ions in the rare earth ions and a desired extraction factor of the yttrium ions and it is usually in a range of 0.1 to 4 equivalent preferably 0.5 to 2.0 equivalent to a total of the rare earth ions.

In the method of the present invention, it is preferable to incorporate nitrate ions in the extraction feed as a salting-out agent for tributyl phosphate. A concentration of nitrate in the extraction feed is usually in a range of more than 2 mole/liter preferably 4 to 8 mole/liter as ammonium nitrate or sodium nitrate.

In the method of the present invention, pH of the extraction feed is adjusted to 2.0 to 5 preferably 2.5 to 4. When pH is lower than 2.0, a complex of HEDTA and the rare earth ion is not formed whereas when pH is higher than 5, a complex of HEDTA and the rare earth ions formed in the extraction feed is too stable whereby the free yttrium ions in the aqueous solution are decreased and the exchange between the lanthanide ions extracted by the extracting solvent and the yttrium ions in the aqueous solution phase is not easily resulted.

The extracting solvent used in the method of the present invention include tributyl phosphate (hereinafter referring to as TBP) and the acid phosphoric ester having the formula (I).

It is possible to dilute them with suitable organic solvent in order to improve the extracting operation.

The acid phosphoric esters having the formula (I) (hereinafter referring to as APA) can be obtained by reacting a corresponding alcohol with phosphorus oxychloride and hydrolyzing the reaction product.

Suitable alcoholic components for APA include 2-heptylundecanol, 7,7-dimethyl-2-(3',3'-dimethyl-1'-methylbutyl)-5-methyloctanol, 2-octyldodecanol, 2-nonyltridecanol, 2-decyltetradecanol, 2-undecryltetradecanol, 2-undecylpentadecanol, 2-dodecylhexadecanol, 2-tridecylpentadecanol, 2-tridecylheptadecanol etc. APA can be esters of single alcohol and also esters of two kinds of alcohols and also a mixture of two or more kinds of esters. APA can be either a diester or a monoester however, it is usual to use APA as a mixture of a diester and a monoester.

Since APA has high viscosity, it is preferable to dilute APA with an organic solvent such as petroleum fraction such as kerosene; aliphatic hydrocarbons such as hexane and decane; ethers such as dibutyl ether and diisopropyl ether; alcohols such as n-hexanol; and aromatic hydrocarbons such as benzene, toluene and xylene, as a diluent at a volumetric rate of 0.3 to 2.

The concentration of APA in the extracting solvent is usually adjusted in a range of 0.001 to 0.5 mole/liter, preferably 0.05 to 0.2 mole/liter. The concentration of TBP is usually adjusted in a range of 20 to 80 vol. %.

In the method of the present invention, the extraction feed having the above-mentioned concentration and pH is contacted with the extracting solvent containing TBP and APA at a volumetric ratio of 0.2 to 5 preferably about 1 whereby the yttrium component is concentrated in the extracting solvent (organic solvent layer) and the lanthanide ions are concentrated in the raffinate (aqueous solution phase).

In the method of the present invention, the ratio of the yttrium ions in the extracting solvent is increased under simultaneous formations of the complex forming equilibrium between the rare earth ions and HEDTA in the aqueous solution phase and the extracting equilibrium between the rare earth ions in the extracting solvent and the free rare earth ions in the aqueous solution. Accordingly, it is preferable to perform the extracting operation until resulting the two equilibriums.

The equilibriums may be given for a residence time of about 10 to 15 minutes in a continuous process under suitable stirring and it may be given for about 10 to 15 minutes in a batch process under suitable stirring.

The yttrium ions having high purity which is extracted into the organic liquid phase can be back-extracted with a mineral acid such as hydrochloric acid and nitric acid.

As described in detail, in accordance with the separation of the yttrium ions of the present invention, the yttrium ions can be separated from the lanthanide ions as well as light rare earth ions without an additional separation of the light rare earth ions. Moreover, the separation factor of the yttrium ions from the other rare earth ions is greater than those of the conventional methods. For example, yttrium ions having a purity of 99% can be obtained in six extracting stages and a purity of 99.99% in twenty extracting stages by using a raw material of mixed rare earth ions containing 60% of an yttrium ions obtained from xenotime. In the method of the present invention, the separation factor of the yttrium ions from the middle heavy rare earth ions (Nd to Lu) can be further increased by selecting suitable extracting conditions. For example, higher separation factor is attained by increasing a ratio of APA to TBP in the extracting solvent or increasing an equilibrium concentration of rare earth ions in the extracting solvent phase.

However, when such conditions are selected, the separation factor for separating the yttrium ions from the light rare earth ions such as La, Ce, Pr and Pr may be decreased. Accordingly, it is preferable to separate the light rare earth ions by the other method. These light rare earth ions can be separated from the yttrium ions with an acid phosphoric ester such as di-(2-ethylhexyl) phosphate in the extraction system having no complexing agent such as HEDTA. Thus, they can be easily separated from the yttrium ions even though APA is mixed in the extracting solvent. Accordingly, the separation of the light rare earth ions and the separation of the middle heavy rare earth ions are attained by using the same extracting solvent.

In accordance with such process, the yttrium ions in high purity which contains less than 10 ppm of a middle heavy rare earth content, can be obtained in twelve extraction stages by using mixed rare earth ions containing 60% of an yttrium ions.

The present invention will be further illustrated by certain examples which shall be interpreted as illustrative and not in a limiting sense.

In the examples, APA was produced by the following process.

APA-1

In the production, 153.5 g of phosphorus oxychloride was added dropwise to a mixture of 540 g of Diadol 18G (Trade name: manufactured by Mitsubishi Chemical Ind., $C_{18}$ alcohol isomers: 75% of 2-heptylundecanol and 25% of other alcohols having branched chain) and 500 g of benzene at 0° to 5° C. under a reduced pressure of 200 to 300 mmHg for 2 hours. The reaction was continued at 20° C. for 3 hours under removing the resulting hydrogen chloride. Then, water at 70° C. was added to the reaction product to hydrolyze it and then, excess water was separated and water and benzene were distilled off at 70° C. under the pressure of 30 mmHg and the residue was treated with active carbon at 70° C. for 1 hour to eliminate color and smell and the active carbon was separated by a filtration to obtain the product having the following formula. The product is referred as APA-1.

| diester | 56.8 wt. % |
| monoester | 5.6 wt. % |
| triester | 14.3 wt. % |
| $C_{18}$ alcohol | 12.5 wt. % |
| $C_{18}$ mono-olefin | 10.8 wt. % |

APA-2

In accordance with the process for producing APA-1 except using 7,7-dimethyl-2-(3',3'-dimethyl-1'-methylbutyl)-5-methyloctanol instead of Diadol 18G, an acid phosphoric ester (hereinafter referring to as APA-2) was obtained. APA-2 contained 0.037 m mole/ml of monoester and 0.607 m mole/ml of diester.

EXAMPLE 1

In the extraction, 50 ml of an aqueous solution containing 0.075 mole/liter of yttrium nitrate, 0.075 mole/liter of dysprosium nitrate and 0.075 mole/liter of HEDTA and 6 mole/liter of ammonium nitrate was mixed with 50 ml of a mixed solvent containing 80 vol. % of TBP, 10 vol. % of APA-1 and 10 vol. % of n-hexanol and the extraction of the yttrium ions was carried out by shaking it for 10 minutes. As the results, extraction factors of the yttrium ions and dysprosium ions the the organic liquid phase were respectively 71.1% and 33.0%. The separation factor of yttrium ions and dysprosium ions (Y partition coefficient/Dy partition coefficient) was 5.02.

EXAMPLE 2

In accordance with the process of Example 1 except using each rare earth nitrate shown in Table 1 instead of dysprosium nitrate, the extraction was carried out. The separation factors are shown in Table 1.

REFERENCE

In accordance with the process of Examples 1 and 2 except using 50 ml of TBP as an extracting solvent, the extraction was carried out and each separation factor of the yttrium ions and the rare earth ions was measured. The results are shown in Table 1.

Table 1

| Ions | Separation factor[1] | |
|------|----------------------|---|
|      | Examples 1 and 2     | Reference |
| Yb | 3.0 | 28.0 |
| Tm | 4.1 | — |
| Er | 4.3 | 3.8 |
| Ho | 4.5 | 2.4 |
| Dy | 5.0 | 2.2 |
| Gd | 7.8 | 2.0 |
| Sm | 8.9 | 2.3 |
| Nd | 9.1 | 1.1 |
| Pr | 7.9 | 0.6 |
| Ce | 8.6 | 0.4 |
| La | 3.7 | less than 0.1 |

[1] Y partition coefficient/lanthanide partition coefficient

EXAMPLE 3

In the extraction, 50 ml of an aqueous solution containing nitrates of Yb, Tm, Er, Ho, Gd, Sm, Nd, Pr, Ce and La at each concentration of 0.002 mole/liter and yttrium nitrate at a concentration of 0.18 mole/liter and HEDTA at a concentration of 0.1 mole/liter and ammonium nitrate at a concentration of 8 mole/liter was mixed with 50 ml of a mixed solvent of APA-1 and n-hexanol (volumetric ratios of 3:1:1) and pH of the aqueous solution phase was kept in 3.25 and the extracting operation was carried out for 10 minutes. As the result, 59.3% of yttrium ions were extracted into the organic liquid phase.

The composition of the rare earth ions prior to the extracting operation and the composition of the rare earth ions extracted into the organic liquid phase, are shown in Table 2.

Table 2

| Ions | Initial compositon (mole %) | Composition after extraction (mole %) |
|------|------------------------------|----------------------------------------|
| Yb | 1.0 | 0.46 |
| Tm | " | 0.48 |
| Er | " | 0.42 |
| Ho | " | 0.43 |
| Gd | " | 0.26 |
| Sm | " | 0.21 |
| Nd | " | 0.23 |
| Pr | " | 0.30 |
| Ce | " | 0.42 |
| La | " | 0.43 |
| Y  | 90.0 | 96.36 |

EXAMPLE 4

In the extraction, 50 ml of an aqueous solution containing nitrates of Lu, Yb, Tm, Er, Ho, Gd, Sm, Nd, Pr, Ce and La at each concentration of 0.002 mole/liter and yttrium nitrate at a concentration of 0.18 mole/liter and HEDTA at a concentration of 0.12 mole/liter and ammonium nitrate at a concentration of 7.5 mole/liter was mixed with 50 ml of a mixed solvent of TBP, APA-2 and kerosene (volumetric ratios of 78:16:6) and pH of the aqueous solution phase was kept in 3.2 and the extracting operation was carried out for 20 minutes.

The concentrations of rare earth ions in the organic liquid phase and in the aqueous solution phase were analyzed and the separation factors of yttrium ions and each lanthanide ions were calculated. The results are shown in Table 3.

Table 2

| Ions | Separation factor[1] |
|------|----------------------|
| Lu | 5.32 |
| Yb | 4.59 |
| T  | 4.04 |
| Er | 3.88 |
| Ho | 4.01 |
| Gd | 4.55 |
| Sm | 4.27 |
| Nd | 2.97 |
| Pr | 1.98 |
| Ce | 1.09 |
| La | 0.51 |

[1] Y partition coefficeint/lanthanide partition coefficient

REFERENCE

In the extraction, 50 ml of an aqueous solution containing chlorides of La, Ce, Pr, Nd and Sm at each concentration of 0.002 mole/liter and yttrium chloride at a concentration of 0.19 mole/liter and ammonium chloride at a concentration of 2 mole/liter was mixed with 100 ml of the extracting solvent of Example 4 and pH of the aqueous solution phase was kept in 2.5 and the extracting operation was carried out for 10 minutes.

The separation factors of yttrium ions and each lanthanide ions shown in Table 4.

Table 4

| Ions | Separation factor[1] |
|------|----------------------|
| La | 32.9 |
| Ce | 16.0 |
| Pr | 13.0 |
| Nd | 12.3 |
| Sm | 6.5 |

[1] Y partition coefficient/lanthanide partition coefficient

As it is clear from Table 4, in the extraction system wherein HEDTA is not incorporated in the aqueous solution phase, yttrium ions are selectively extracted into the organic liquid phase and light rare earth ions can be easily separated.

EXAMPLE 5

A crude yttrium oxide containing impurities of 0.5 wt. % of $Lu_2O_3$, 6.5 wt. % of $Yb_2O_3$, 0.5 wt. % of $Tm_2O_3$, 6.7 wt. % of $Er_2O_3$, 2.1 wt. % of $Ho_2O_3$, 8.6 wt. % of $Dy_2O_3$, 3.0 wt. % of $Gd_2O_3$, 0.8 wt. % of $Sm_2O_3$, 0.1 wt. % of $Nd_2O_3$ and 0.02 wt. % of $Pr_2O_3$ was used as a raw material and the yttrium ions were extracted with an extracting solvent of TBP, APA-2 and kerosene (volumetric ratios of 78:16:6) in sixteen counter-current extraction stages.

An aqueous solution containing HEDTA at a concentration of 0.18 mole/liter and ammonium nitrate at a concentration of 7.5 mole/liter in pH of 3.5 was fed as a scrubbing solution from the first stage at a rate of 900 vol. parts per hour and the extracting solvent was fed from the 16th stage at a rate of 400 vol. parts per hour.

On the other hand, the crude yttrium oxide was dissolved in nitric acid to obtain a nitric acid aqueous solution containing rare earth nitrates at a concentration of 0.9 mole/liter and ammonium nitrate at a concentration of 4 mole/liter in pH of 3.0. The solution was contacted with the extracting solvent (5 volumetric times to the solution) to extract all of the rare earth ions.

The extracting solvent containing extracted rare earth ions was fed from the 12th stage at a rate of 600 vol. parts per hour. In the extracting operation, pH in the first to the 15th stages was adjusted to 3.3 to 3.5 and pH in the 16th stage was adjusted to 2.2.

Yttrium product having high purity was obtained from the organic liquid phase in the first stage. The impurities in the yttrium product obtained in the normal state were analyzed to find less than 10 ppm.

What is claimed is:

1. A method of selectively separating yttrium ions from the lanthanide ions without an additional seperation of the light rare earth ions, which comprises:

extracting the yttrium ions by contacting an aqueous solution of pH ranging from 2.0 to 5.0 containing yttrium ions and lanthanide (atomic number 57–71) ions in a combined concentration of 0.005 to 2 g atom/liter, and hydroxethyl ethylenediaminetriacetic acid, the ratio of said hydroxyethyl ethylenediaminetriacetic acid to yttrium ions and lanthanide ions ranging from 0.1 to 4 equivalents per equivalent of yttrium ions and lanthanide ions, with an extracting solvent containing tributyl phosphate and an acid phosphoric ester having the formula:

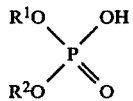 (1)

wherein $R^1$ and $R^2$ can be hydrogen and/or an alkyl group having the formula:

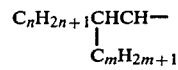

wherein n is an integer of 6 to 15 and m is n−1 or n−2 with the proviso that $R^1$ and $R^2$ cannot both be hydrogen, said acid phosphoric ester and tributyl phosphate ranging in concentration from 0.001 to 0.5 mole/liter and 20 to 80 volume percent respectively in said extracting solvent, wherein the volume ratio of said aqueous solution to said extracting solvent ranges from 0.2 to 5.0 whereby the yttrium component is concentrated in the extracting solvent and the lanthanide ions are concentrated in the aqueous solution phase.

2. The method of claim 1 wherein $R^1$ is hydrogen or

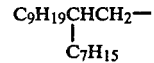

and $R^2$ is

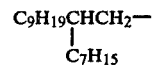

3. The method of claim 1 wherein $R^1$ is hydrogen or 7,7-dimethyl-2-(3',3'-dimethyl-1'-methylbutyl)-5-methyloctyl and $R^2$ is 7,7-dimethyl-2-(3'3'-dimethyl-1'-methylbutyl)-5-methyloctyl and $R^2$ is 7,7-dimethyl-2-(3'3'-dimethyl-1'-methylbutyl)-5-methyloctyl.

4. The method of claim 1 wherein $R^1$ is hydrogen or 2-heptylundecyl and $R^2$ is 2-heptylundecyl.

5. The method of claim 1 wherein said aqueous solution contain 2 to 8 g ion/liter of nitrate ions.

* * * * *